(12) United States Patent
Kailbach et al.

(10) Patent No.: US 7,433,671 B2
(45) Date of Patent: Oct. 7, 2008

(54) M:N PATH PROTECTION

(75) Inventors: Walter Kailbach, Leonberg (DE);
Kerstin Skerra, Ludwigsburg (DE);
Hans-Jörg Jäkel, Stuttgart (DE);
Martin Huck, Möglingen (DE)

(73) Assignee: Alcatel, Paris (FR)

( * ) Notice: Subject to any disclaimer, the term of this patent is extended or adjusted under 35 U.S.C. 154(b) by 1238 days.

(21) Appl. No.: 10/603,614

(22) Filed: Jun. 26, 2003

(65) Prior Publication Data
US 2004/0022279 A1 Feb. 5, 2004

(30) Foreign Application Priority Data
Aug. 5, 2002 (EP) .................. 02360233

(51) Int. Cl.
*H04M 11/00* (2006.01)
*H04J 3/02* (2006.01)
(52) U.S. Cl. ............... 455/403; 455/417; 455/418; 370/542
(58) Field of Classification Search .......... 455/403, 455/418, 419, 417; 370/228, 282, 389, 542, 370/540
See application file for complete search history.

(56) References Cited
U.S. PATENT DOCUMENTS 6,798,748 B1 * 9/2004 Hessler et al. .............. 370/242
6,915,463 B2 * 7/2005 Vieregge et al. ............ 714/704
7,072,361 B1 * 7/2006 Player ....................... 370/470

FOREIGN PATENT DOCUMENTS

EP          0 964 543 A2    12/1999
WO          WO 00/59144 A1  10/2000

OTHER PUBLICATIONS

Okamoto S et al: "Network Portection and OA&M mechanism for WDM Optical Path Transport Networks" ICC 98. Conference Record. IEEE International Conference on Communications, Atlanta, GA, USA Jun. 7-11, 1998, Jun. 7, 1998, pp. 207-212, XP010284551.

* cited by examiner

*Primary Examiner*—Melur Ramakrishnaiah
(74) *Attorney, Agent, or Firm*—Sughrue Mion, PLLC

(57) ABSTRACT

An 1:n or m:n path protection mechanism is provided. Rather than defining an automatic protection protocol, use is made of the existing tandem connection monitoring function, tandem connection reverse defect indication, and tandem connection trail trace identifier. Upon detection of a failure on the working path segment, the occurrence of this failure is communicated to the far end node by inserting forced RDI into the tandem connection as long as the failure persists. In the case of more than one protected paths, the failed path is identified by means of the unique trail trace identifier received on the protection path. In the case of several protection paths, one network node is defined as slave node which has to follow the switch-over initiated by the master node and choose the same protection path as the master node. Preferably, a combination of two timers enables return from failure condition to normal operation.

16 Claims, 13 Drawing Sheets

M:N PATH PROTECTION

The invention is based on a priority application EP 02360233.7 which is hereby incorporated by reference.

FIELD OF THE INVENTION

The invention relates to the field of telecommunications and more particularly to a method and corresponding network element for path protection in a transmission network.

BACKGROUND OF THE INVENTION

Transmission networks serve for the transport of user signals, commonly referred to as tributary signals, in the form of multiplexed transmission signals. A transmission network consists of a number a physically interconnected network elements such as add/drop multiplexers, terminal multiplexers, cross-connects and line equipment. The physical interconnection between two network elements is referred to as a section or link while the route a particular tributary takes through the transmission network from end to end is known as a path. Although in the context of path protection, the term path is commonly also used for a segment of a path, the above specification uses the more appropriate terminology and distinguishes between entire paths (from end to end) and path segments without path termination function. A path is represented by a multiplexing unit like a virtual container (VC-N) with its associated path overhead (POH) in SDH (Synchronous Digital Hierarchy). Conversely, a section is represented by an entire transmission frame like a synchronous transport module (STM-N) with its associated section overhead (SOH).

A very basic aspect of transmission networks is availability of service. Hence, a transmission network itself or the combination of network and network management needs to provide the means and facilities to ensure sufficient availability. Typically, these network mechanisms are distinguished in protection and restoration. The principle of both is to redirect traffic of a failed link to a spare link. Restoration means network management interaction to determine an alternative route through the network while protection uses dedicated protection resources already available and established in the network for this purpose.

Protection mechanisms are widely used and standardised. For example ITU-T G.841 and G.783 describe several protection mechanisms for SDH networks and G.709, G.798 describe corresponding protection mechanisms for OTNs (Optical Transport Networks).

Section protection refers to the protection of a physical link between two network elements. Known section protection mechanisms include 1+1 MSP (Multiplex Section Protection), 1:1 MSP, 1:n MSP and MS-SPRING (Multiplex Section Shared Protection Ring). 1+1 MSP means that two redundant links are provided between two network elements and that all traffic is permanently bridged to the protection links so that the receiving network element can choose the better of the two received signals. 1:1 MSP means that the protection link can be used for extra traffic that is discarded instantly in the case of a failure of the working link and the protected traffic bridged from the failed working to the protection link. 1:n MSP denotes a protection mechanism where one protection link serves to protect n working links. In the case of a failure, traffic from the failed link is bridged to the protection link. 1:1 MSP, 1:n MSP and MS-SPRING require a protocol to communicate a failure from sink to source and synchronize switch-over. SDH uses K1/K2 bytes in the section overhead (SOH) for this purpose.

Conversely, path protection refers to the protection of a path or a segment thereof. G.783 describes a 1+1 path protection mechanism for SDH, which is known as SNCP (Sub-Network Connection Protection). Like for 1+1 MSP, the protected traffic is permanently bridged to a dedicated protection path. A trail termination function required for path level protection is discussed in ITU-T study group 15 draft G.gps (CD-GPS01). An automatic protection protocol on path level is still under discussion and not yet defined, so that 1:1 or 1:n protection on path level is not possible today.

Thus, existing path protection mechanisms require a 100% spare capacity of resources for protection in the network but allow a very fast masking of the failure in terms of availability, typically in less than 50 ms.

Restoration mechanisms are introduced in network management in order to use the spare resources of a network for traffic protection in a flexible way and therefore to reduce the necessary amount of spare resources in a meshed network.

Restoration mechanisms are more stringent in the usage of spare capacity but however, provide a masking of the failure at a lower speed, typically in the range of a few seconds, as completely new paths through the network need to be established by the network management system after the occurrence of a failure. Therefore restoration is regarded as too slow for many applications.

It is therefore an object of the present invention to provide a more efficient and more flexible protection method on path level which allows masking of a failure within shorter time than known restoration methods while still requiring less spare resources in the network than traditional 1+1 path protection mechanisms do.

SUMMARY OF THE INVENTION

These and other objects that appear below are achieved by a method that implements a 1:n or m:n path protection mechanism. Rather than defining a protection protocol to communicate failures and to synchronize switch-over from active to protection path, use is made of the existing tandem connection monitoring (TCM) function, a forced tandem connection reverse defect indication (TC-RDI), and a tandem connection trail trace identifier (TC-TTI). Preferably, the protection method is combined with background restoration of failed paths via network management to re-establish protection after a failure or to revert protection after a new working path is re-established.

In particular, the protection method according to the present invention includes the following steps to recover traffic after the occurrence of a failure affecting a protected network path. First, at least one protected path segment is provided between a first network element and a second network element and at least one protection path segment is provided as well between the first and second network elements. A tandem connection monitoring function is activated on the protected path segment. The protected paths segment is monitored for failures using a tandem connection monitoring function and upon detection of a failure, the occurrence of this failure is communicated to the far end network element using a defect indication and traffic is bridged from the active to the protection path segment. Upon reception of reverse defect indication in the far end network element, the latter bridges traffic from active to the protection path segment, as well. In the case of more than one protected path segments, the failed path is identified by means of a unique trail trace identifier received on the protection path segment. In the case of several protection path segments, one network node is defined as slave node which has to follow the switch-over initiated by the master node and choose the same protection path segment as the master node. Preferably, a combination of two timers enables return from failure condition to normal operation.

The invention allows very fast recovery from failure and can be implemented as an extension of existing mechnisms, which means little implementation effort and the possibility of a stepwise implementation approach.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
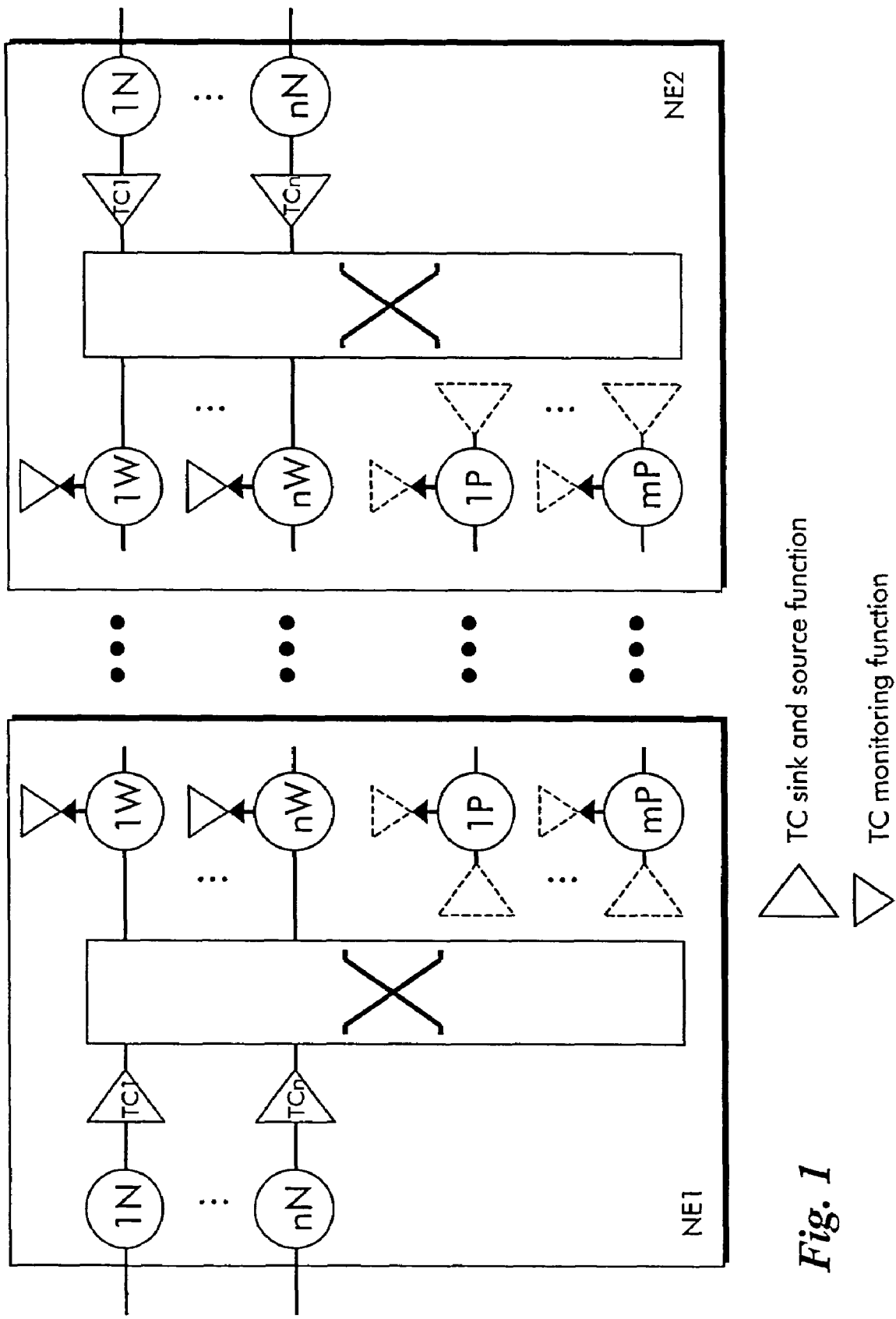
FIG. 1 shows a bi-directional m:n path protection according to the invention.

The invention recognizes the need for more efficient but inherently fast protection method on path level in a transmission network. The invention therefore proposes an m:n sub-network connection protection (SNCP), where n working paths are protected by m protection paths (0<m≦n). An m:n sub-network connection protection is shown schematically in FIG. 1. The path segment ends are denoted by circles in the figures. A first network element NE1 receives n tributary signals 1N-nN (only first and nth tributary signals are shown), which should be transmitted through a transmission network (not shown) to a far end second network element NE2. A number of n working path segments 1W-nW are thus established through the network from NE1 to NE2. In order to protect these n working path segments, m protection path segments 1P-mP are established between NE1 and NE2, too. All paths are bi-directional, i.e., traffic is passed in both direction between NE1 and NE2. In each of the two network elements NE1, NE2, a switching matrix connects the tributary I/O signals to the corresponding working path segments. The switching matrices serve also for bridging traffic from the tributary I/O signals to protection path segments in the case of a failure.

The m:n protection implies disjoint routing of the working paths (i.e., the use of different physical paths) as far as possible as well as of the protection path in order to reduce the probability of simultaneous multiple failures within the configuration.

As the working paths obviously cannot be permanently bridged to corresponding protection paths, a communication between sink and source network elements is required to communicate failure conditions, negotiate which protection path segment to use and synchronize switch-over. A basic idea of the present invention is thus to use the existing tandem connection monitoring function specified in ITU-T G.707, G.709, and G.783, which are incorporated by reference herein. Tandem connection monitoring in SDH uses the N1 byte of the path overhead (POH) of the virtual container (VC-4) and creates a 76 byte multiframe that is periodically repeated in the N1 byte. On VC-12 or VC-3 level, the N2 byte is available for this function.

A tandem connection is usually defined on a segment of a path also referred to as trail and exists for the purpose of alarm and performance monitoring. For instance, a tandem connection can be transported over a linked sequence of sections on a transmission path.

In the figures, tandem connection source and sink functions are shown as rotated triangles oriented to either left or right. Triangles pointing in transmit direction denote TC source functions and those pointing in receive direction are denoted as TC sink functions. Non-intrusive tandem connection monitoring functions are shown by upturned triangles.

According to the present invention tandem connections are created on the working path segments between NE1 and NE2. For instance, a tandem connection TC1 for the working path segment 1W is created between termination point 1N and the switching matrix and monitored at the corresponding point 1W. Preferably, tandem connections are created and monitored on the protection paths 1P-nP, too. It has to be noted that on the protection path segments either the TC termination functions or the non-intrusive TC monitoring functions are activated but not both simultaneously.

FIGS. 2 to 7 illustrate the activities of the network elements to recover traffic in the case of a failure. All figures show the termination points of the paths and tandem connections functions. All failures shown in the below examples affect the protected path 1W. However, this is without restriction to generality as can be seen by simple renumbering of the paths.

Figure 2:
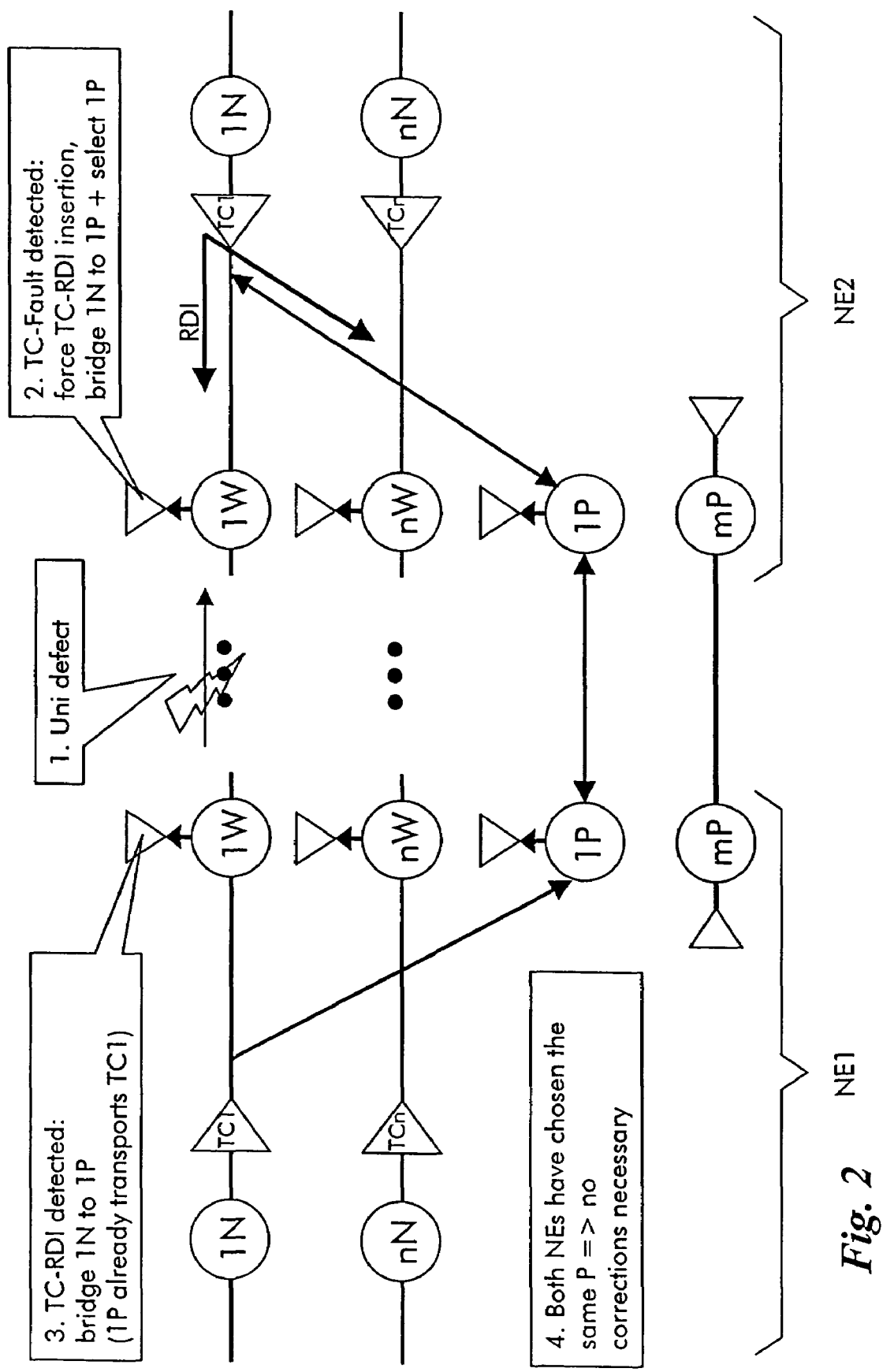
FIG. 2 shows the occurrence of a unidirectional failure and the actions performed by the terminating network elements to recover traffic.

FIG. 2 illustrates the behaviour in the case of a unidirectional failure. The occurrence of the unidirectional failure on the path 1W is denoted by field 1. The receive end tandem connection monitoring function in receive end point 1W of network element NE2 detects a fault in the tandem connection created on that path segment. As a consequence action shown in field 2, the monitor forces insertion of a reverse defect indication RDI into the overhead of outgoing transmission signals on path 1W and initiates a bridge in the reverse direction from 1N to 1P. Further, the protection path segment 1P is selected to receive transmission signals for 1N.

In a next step shown in field 3 the tandem connection monitoring function of network element NE1 detects RDI in the received signal. As a consequence action, network element NE1 also bridges traffic from 1N to 1P. However, NE1 may keep its selection of 1W to receive traffic from 1N. Further, NE1 also receives traffic from 1N over protection path segment 1P as the far end network element NE2 has switched a bridged from 1N to 1P and can thus likewise select 1P for traffic from 1N. As both network elements have chosen the same protection path segment 1P, no corrective measures are necessary (field 4). The switch-over is now complete and traffic from failed path segment 1W restored.

It is important to note that according to the present invention, forced TC-RDI is permanently inserted into the traffic signal as long as the failure on working path segment 1W persists. According to the conventional tandem connection protocol, any RDI would immediately disappear as soon as the traffic is re-established over the protection path segment. Therefore, according to traditional TC protocol, it would not be possible to communicate the status of the failed working path segment 1W from sink to source.

The unique tandem connection trail trace identifier (TC-TTI) is used to identify the bridged traffic on a protection path segment. This is especially important if several protection path segments protect several working path segments and it would thus not be certain which working path segment is bridged to which protection path segment.

Rather than using the TC-RDI, use can also be made of the outgoing defect indication (ODI) of the tandem connection. In this case, the ODI has to be forced to inactive as long as no tandem connection defect is detected and forced to active when a tandem connection defect is detected. The use of ODI rather than TC-RDI has the advantage that the far end performance monitoring data is not disturbed.

The fault conditions for the tandem connection monitor can be any of the following failures:

| | |
|---|---|
| TC-SSF | tandem connection server signal fail, i.e., the next higher server layer has already failed, SSF is thus generated to prevent misleading alarms at lower layers. |
| TC-UNEQ | tandem connection unequipped, i.e., no tandem connection information is received. |
| TC-TIM | tandem connection trail trace identifier mismatch, i.e., a wrong TC-TTI is received. |
| TC-LTC | loss of tandem connection, i.e., a tandem connection signal is received but the TC multiframe is faulty and cannot be evaluated. |

Figure 3:
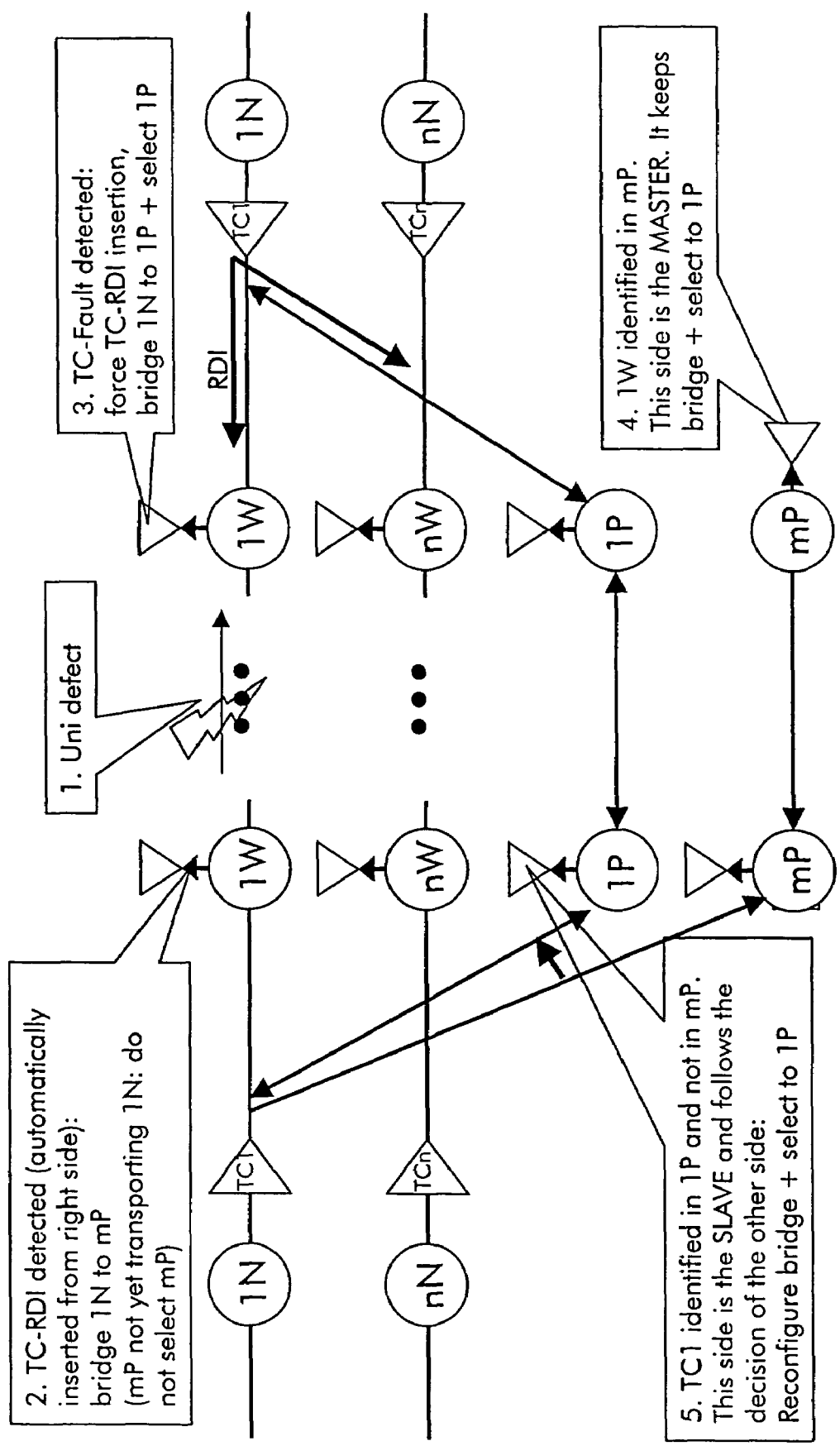
FIG. 3 shows an alternative to recover the traffic in the failure condition shown in FIG. 2.

FIG. 3 shows the situation where network element NE1, responsive to detecting RDI on the failed path segment 1W, has chosen a different protection path segment mP. This can happen in the situation where no protection path segment already contains tandem connection information TC1 from 1N. Therefore, correction of the switch over is necessary. Network element NE1 on the left hand side is defined as slave while network element NE2 on the right side is defined as the master. Network element NE1 detects tandem connection TC1 from failed path segment 1W at protection path segment 1P. As slave network element, it has to follow the decision of network element NE2 and reconfigures its bride 1N-nP to 1N-1P and selects 1P to receive traffic for 1N.

At the same time, network element NE2 on the for end side detects tandem connection information TC1 from 1W in mP, which was initially chosen by network element NE1. However, because network element NE2 is defined as master, it keeps its bridge to and selection of 1P.

Figure 4:
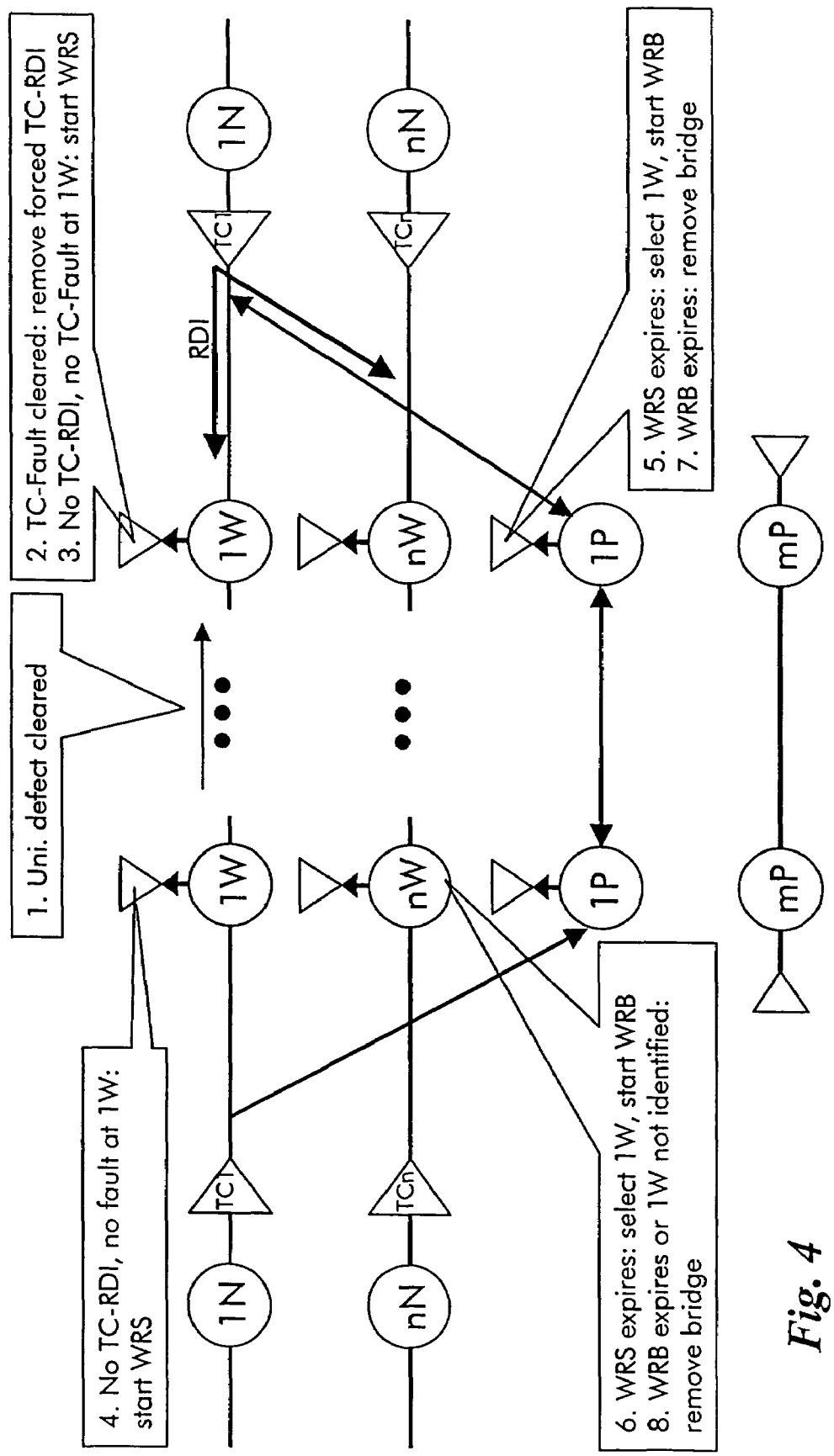
FIG. 4 shows the return from the failure condition of FIG. 2 or 3 to normal operation.

FIG. 4 shows the return to normal operation after repair of the unidirectional failure. Field 1 indicates that the unidirectional failure has been cleared. In a first step (field 2), tandem connection monitoring function for path segment 1W in network element NE2 detects that the tandem connection fault is cleared and valid tandem connection information is received. As a consequence action, the forced RDI insertion is removed. As no tandem connection RDI is received and no TC fault is detected anymore on 1W, a first timer, which is called WRS (Wait to Revert Selection), is started (field 3). At the same time, network element NE1 detects at its tandem connection monitoring function for 1W that no TC-RDI is received anymore (field 4). As there is no fault condition for 1W, it starts its first timer WRS, too.

After the WRS timer in network element NE2 expires, path segment 1W is selected for 1N and a second timer called WRB (Wait to Remove Bridge) is started (field 5). At about the same time, WRS timer in network element NE1 expires as well (field 6) and network element NE1 selects if necessary 1W again as active path segment for 1N and starts its second timer WRB.

After the WRB timer in network element NE2 expires, NE2 removes the bridge from 1N to 1P (field 7). At about the same time, WRB timer in network element NE1 expires as well (field 8) and NE1 removes its bridge from 1N to 1P as well and return to normal operation is complete.

Figure 5:
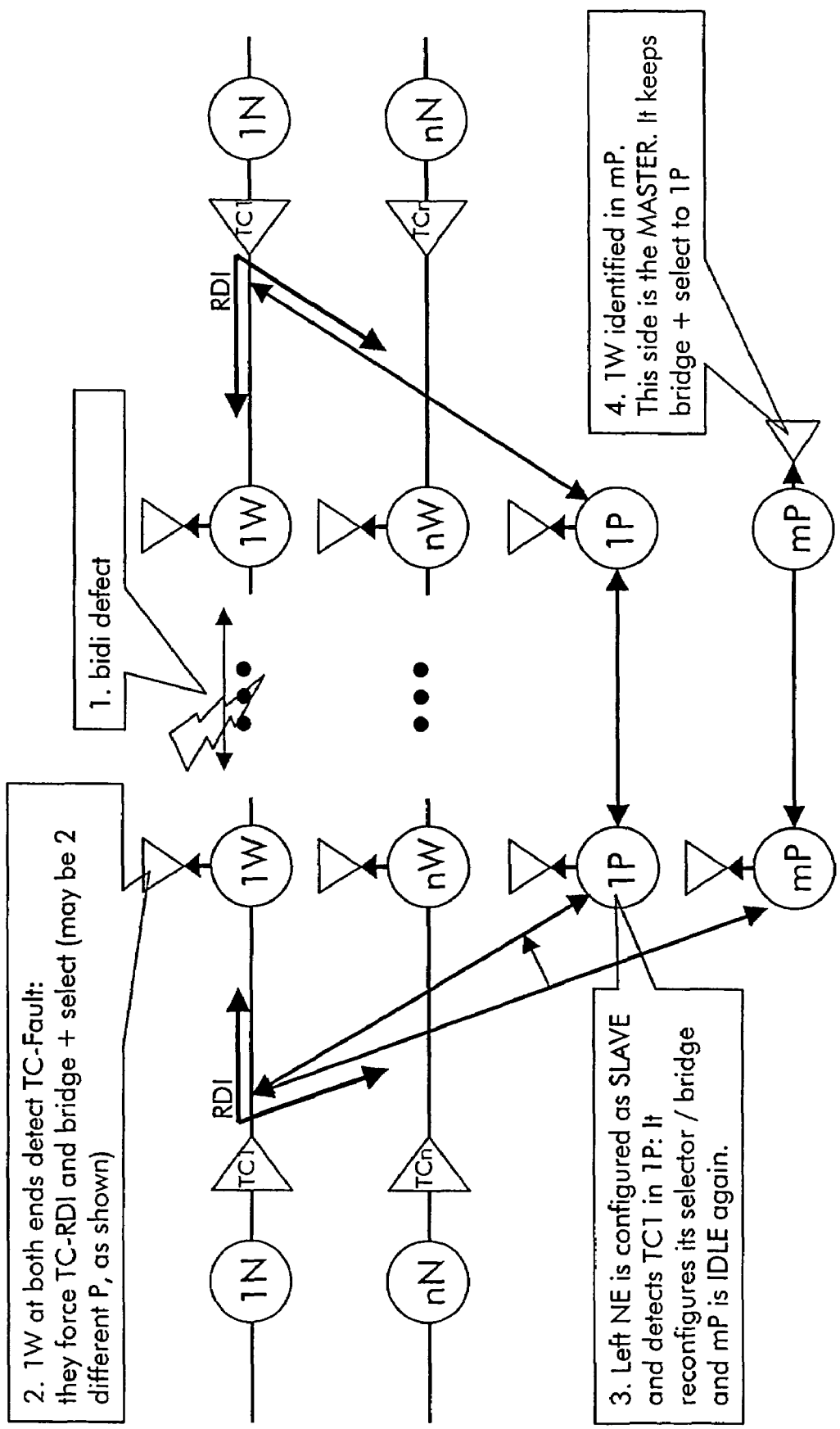
FIG. 5 shows the occurrence of a bi-directional failure and the actions performed by the terminating network nodes to recover traffic.

FIG. 5 shows the occurrence of a bidirectional failure (field 1) on active path segment 1W. The tandem connection monitoring functions in both network elements detect a fault condition and force insertion of TC-RDI, bridge 1N to a protection path segment and select this protection path segment for receiving traffic for 1N (field 2). The selection of the protection path segment is random in the first step. As shown, network element NE1 selects and bridges to protection path segment mP while network element NE2 selects and bridges to 1P. As the selected protection paths segment do not match, corrective measures are necessary. Network element NE1 is defined as slave, while network element NE2 is defined as master. Therefore, network element NE1, as it detects tandem connection information TCI for path 1N on protection path segment 1P, reconfigures its selection to 1P and shifts the bridge from 1N-mP to 1N-1P. Conversely, network element NE2 detects tandem connection information TC1 on protection path segment mP but does not reconfigure its protection switching as it is defined as master network element, i.e., not to track the switch decision of the for end side. Protection switching is thus established and traffic from protected path 1N restored.

Figure 6:
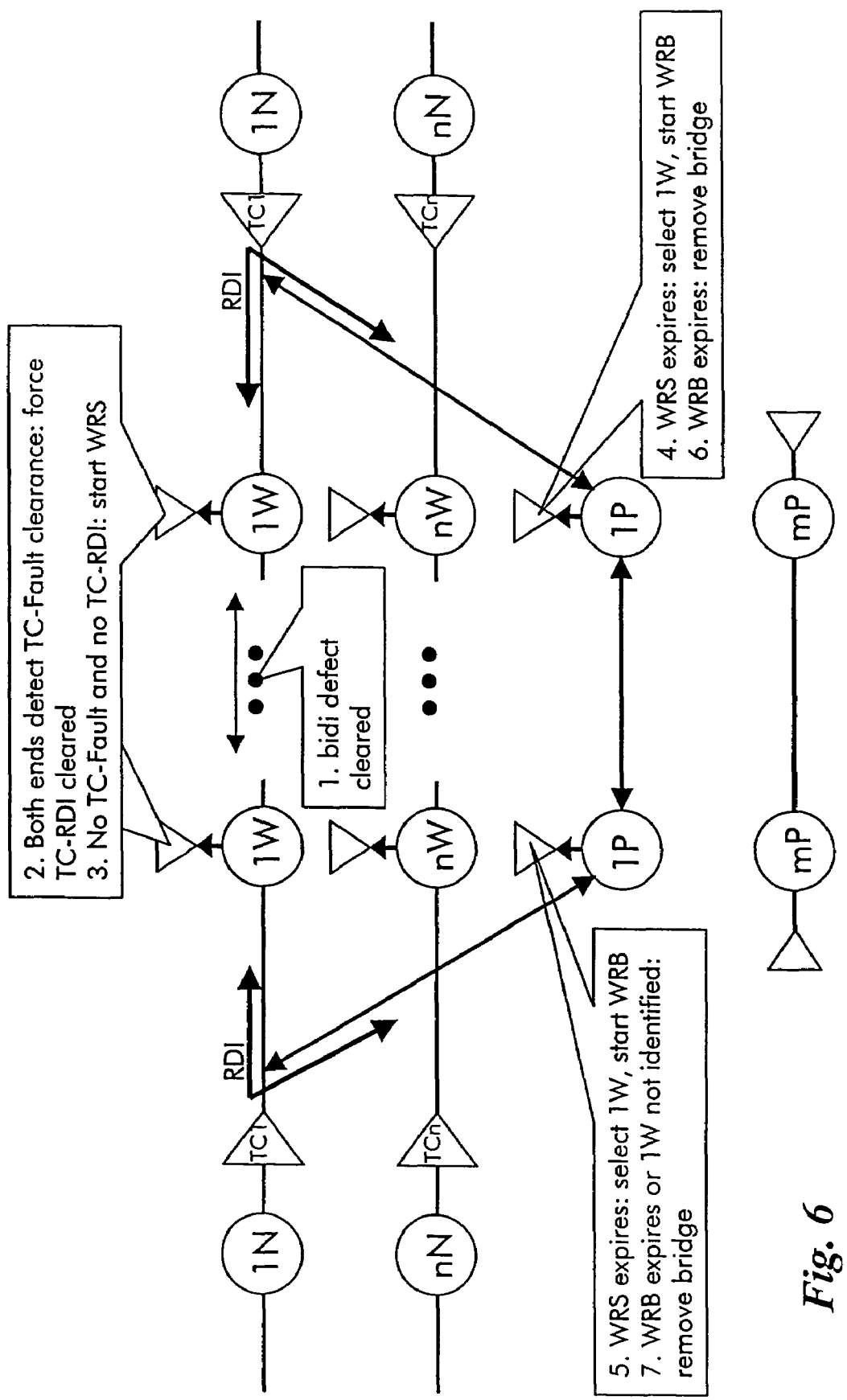
FIG. 6 shows the return from the failure condition of FIG. 5 to normal operation.

FIG. 6 shows the return to normal operation after the bidirectional failure of FIG. 5 has been repaired. Field 1 indicates that the bi-directional failure has been cleared. Both network elements detect that the tandem connection fault condition has disappeared (field 2) and clear their forced TC-RDI insertion. Then they both start their WRS timer (field 3).

After the WRS timer in network element NE2 expires, path segment 1W is selected for 1N and a WRB timer is started (field 4). At about the same time, WRS timer in network element NE1 expires as well (field 5) and network element NE1 also selects 1W as active path segment to receive traffic for path 1N and starts its WRB timer.

After the WRB timer in network element NE2 expires, NE2 removes the bridge from 1N to 1P (field 6). At about the same time, WRB timer in network element NE1 expires as well (field 7) and NE1 removes its bridge from 1N to 1P as well and return to normal operation is complete.

Figure 7:
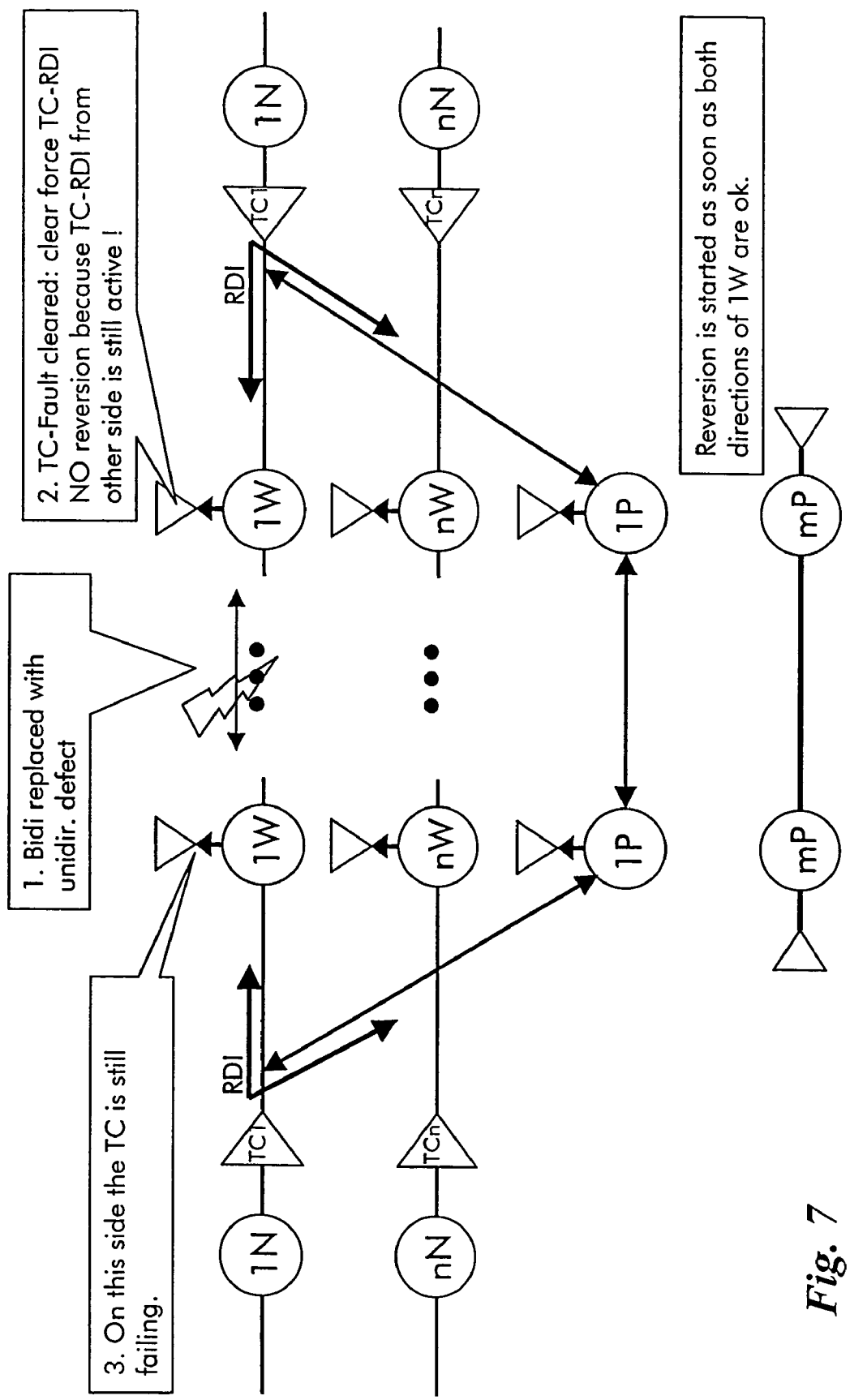
FIG. 7 shows the situation when the bi-directional failure of FIG. 5 changes into a unidirectional failure.

FIG. 7 shows what happens in the case when the bi-directional failure is repaired in only one direction and thus changes into a unidirectional failure (field 1). Network element NE2 detects that the tandem connection fault condition does no longer exist and clears its forced TC-RDI insertion (field 2). But as it still receives TC-RDI from network element NE1 on path segment 1W, it does not initiate return to normal operation and keeps selection of path segment 1P and bridge from 1N to 1P active. Reversion is started only when both directions of 1W are okay, i.e., when there is no TC-RDI anymore in either direction.

Figure 8:
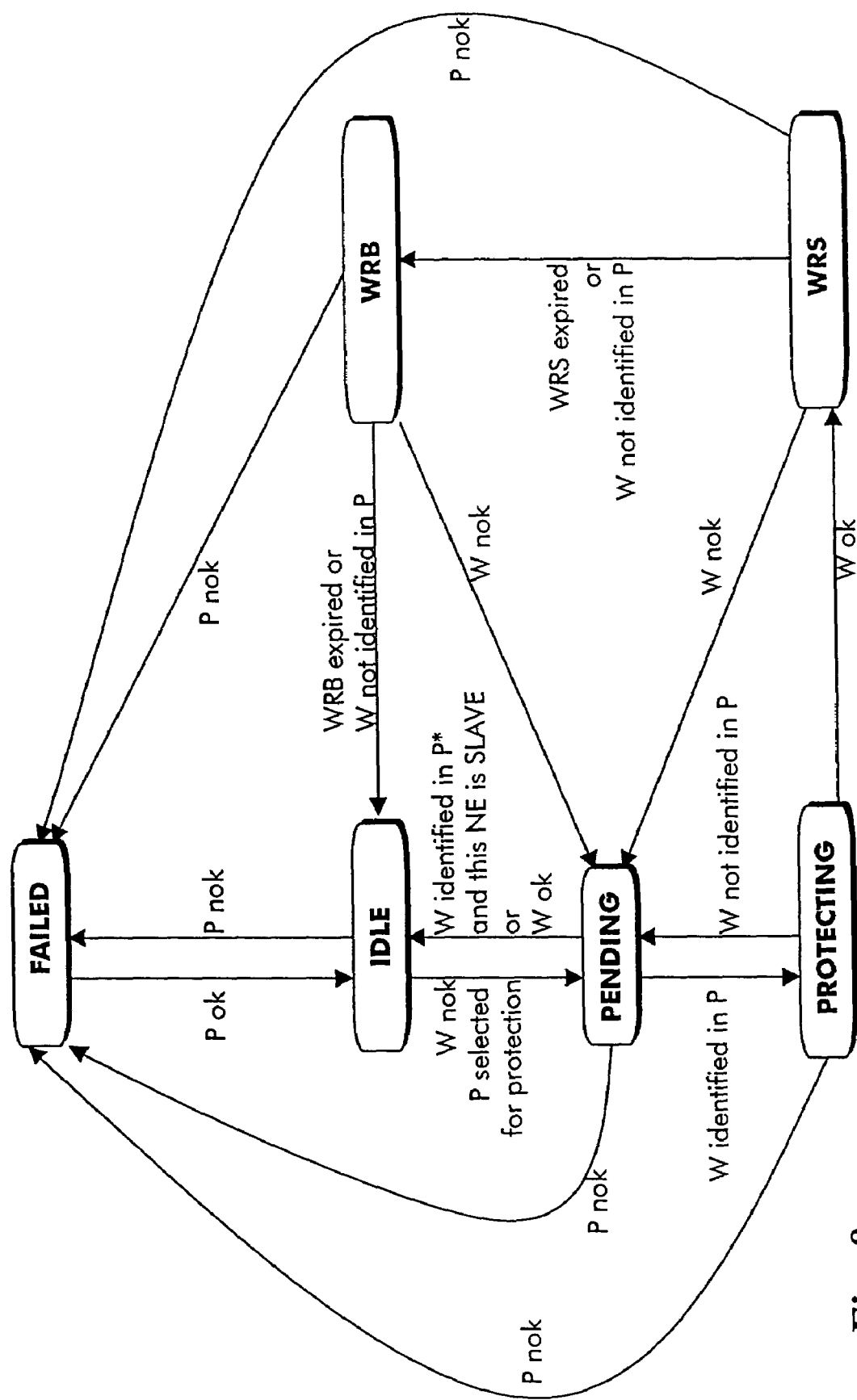
FIG. 8 shows a state diagram for a protection path.

A state diagram for a protection path is presented in FIG. 8. It contains the following states:

| | |
|---|---|
| FAILED | This state is entered if in the IDLE state the TC(P) sink or during PENDING/PROTECTING/WRB/WRS the TC(P) monitor has detected a TC-Fault (=TC-SSF, TC-UNEQ, TC-TIM or TC-LTC) or TC-RDI. TC-TIM is only considered if it does not match to any TC-TTI defined for the working paths. P is continuously monitored with a TC(p) sink/source function. N.B. during protection there will be an sctive TC-TIM alarm and forced inserted TC-RDI is not reported by TC(p) because the TIM alarm suppresses TC-RDI. |
| IDLE | xP is idle and supervised with TC(P) (sink/source) and there is no TC-Fault or TDC-RDI. |
| PENDING | xP is selected to protect yW. The normal path (yN) is bridged to xP and xP is selected. In case yW detects a TC-Fault the TC source at yN is forced to insert TC-RDI. The far end NE has not yet initiated the protection. N.B., yW shall be selected if it is only in TC-RDI. |
| PROTECTING | xP protects yW. The normal path (yN) is bridged to xP and xP is selected. In case yW detects a TC-Fault, the TC source at yN is forced to insert TC-RDI. |
| WRS | Wait to Reverse Selector, yW ok, bridge to xP, xP selected. |
| WRB | Wait to Remove Bridge, yW ok, bridge to xP, yW selected. |

The following events are considered in FIG. 8:

| | |
|---|---|
| Signal Events | |
| W ok | TC-Faults and TC-RDI cleared (transition 'W nok' –> 'W ok') |
| W nok | TC-Fault or TC-RDI detected (transition 'W ok' –> 'W nok') |
| P ok | No TC-Fault and no TC-RDI detected. |
| P nok | TC-Fault or TC-RDI detected. TC-TIM is only considered if it does not match to any TC-TTI defined for the working paths. A TC-TIM alarm suppresses TC-RDI, e.g., when the other side has bridged a working channel (this would lead to TC-TIM for the TC(P) and is forcing insertion of TC-RDI; this TC-RDI would not be detected and P would still be ok). |
| Identification Events | |
| W identified in P | Signal from path segment W is identified in path segment P |
| W not identified in P | Signal from path segment W is not identified in path segment P |
| W identifi d in P* | while path segment W is being bridged to path segment P, signal from path segment W is identified in path segment P* |
| Timer Events | |
| WRB, WRS exp. | WRB, WRS timer function expired. |

The table at the end of the specification shows an event/state check for the state diagram in FIG. 8.

Figure 9:
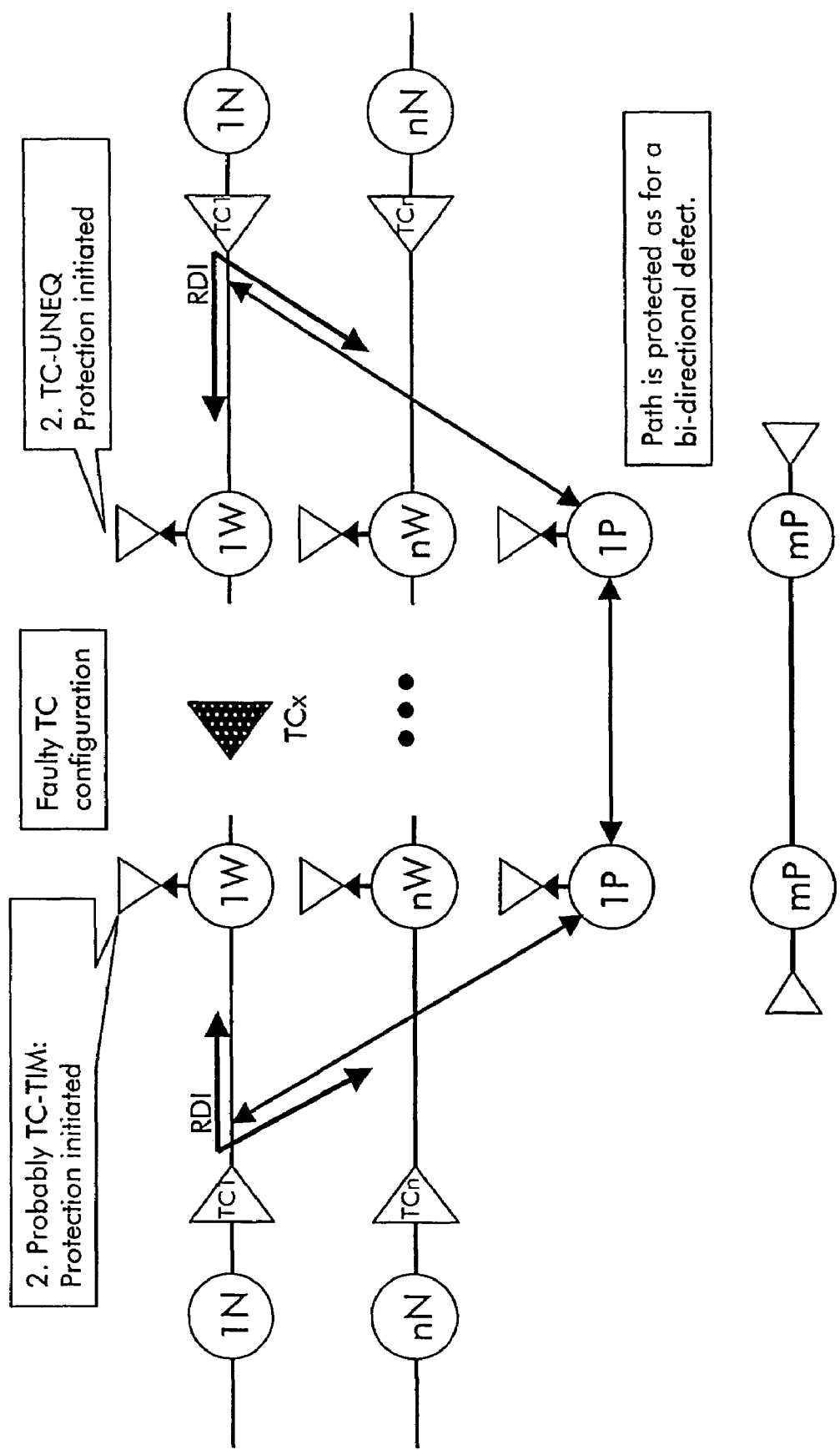
FIGS. 9 to 12 show some exceptional situations and corresponding counteractions.

FIG. 9 shows the exceptional situation when an external tandem connection interferes with the tandem connection created on the protected path segment. This situation may occur especially in SDH networks since SDH allows only one level of tandem connections while nested or overlapping tandem connections are not permitted. Therefore, this situation is regarded as faulty and protection switching is initiated as for a bi-directional failure (see FIG. 7).

In FIG. 9, network element NE2 detects a failure condition TC-UNEQ (tandem connection unequipped) on path segment 1W, i.e., it receives no tandem connection information as the TC signal inserted by network element NE1 is terminated by the faulty tandem connection sink function on the path segment 1W. Therefore, it initiates protection switching as in FIG. 7.

Network element NE1 probably detects TC-TIM (tandem connection trail trace identifier mismatch), depending on the TC-TTI (trail trace identifier) used in the external tandem connection. In this case, NE1 also initiates protection switching as in FIG. 7.

Figure 10:
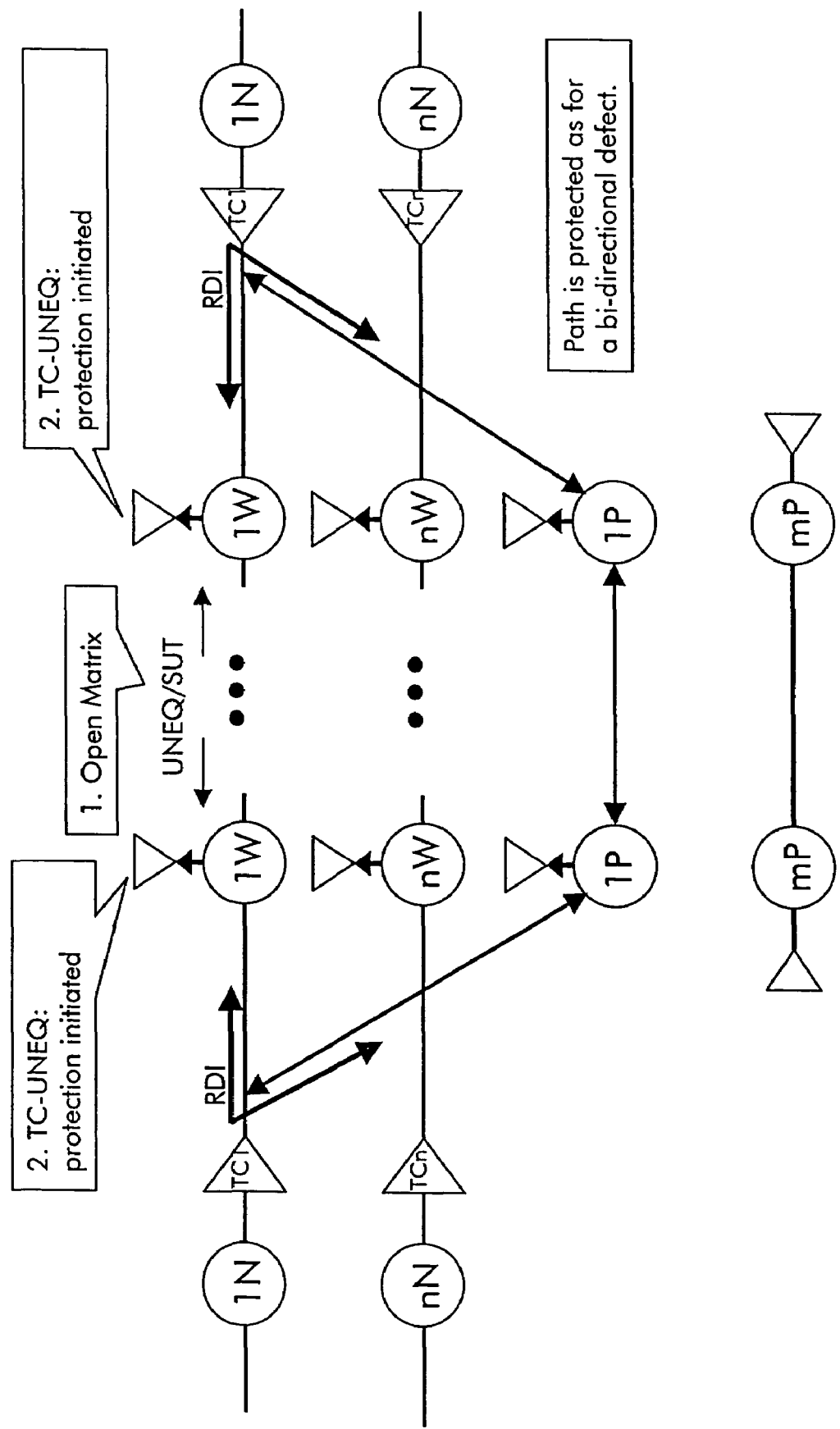

FIG. 10 shows the situation when an intermediate network element has opened the connection, for example in its switching matrix. Field 1 denotes an open matrix in an intermediate network element. Both terminating network elements thus receive and detect an unequipped tandem connection signal (field 2) and initiate path protection as for a bidirectional failure.

Figure 11:
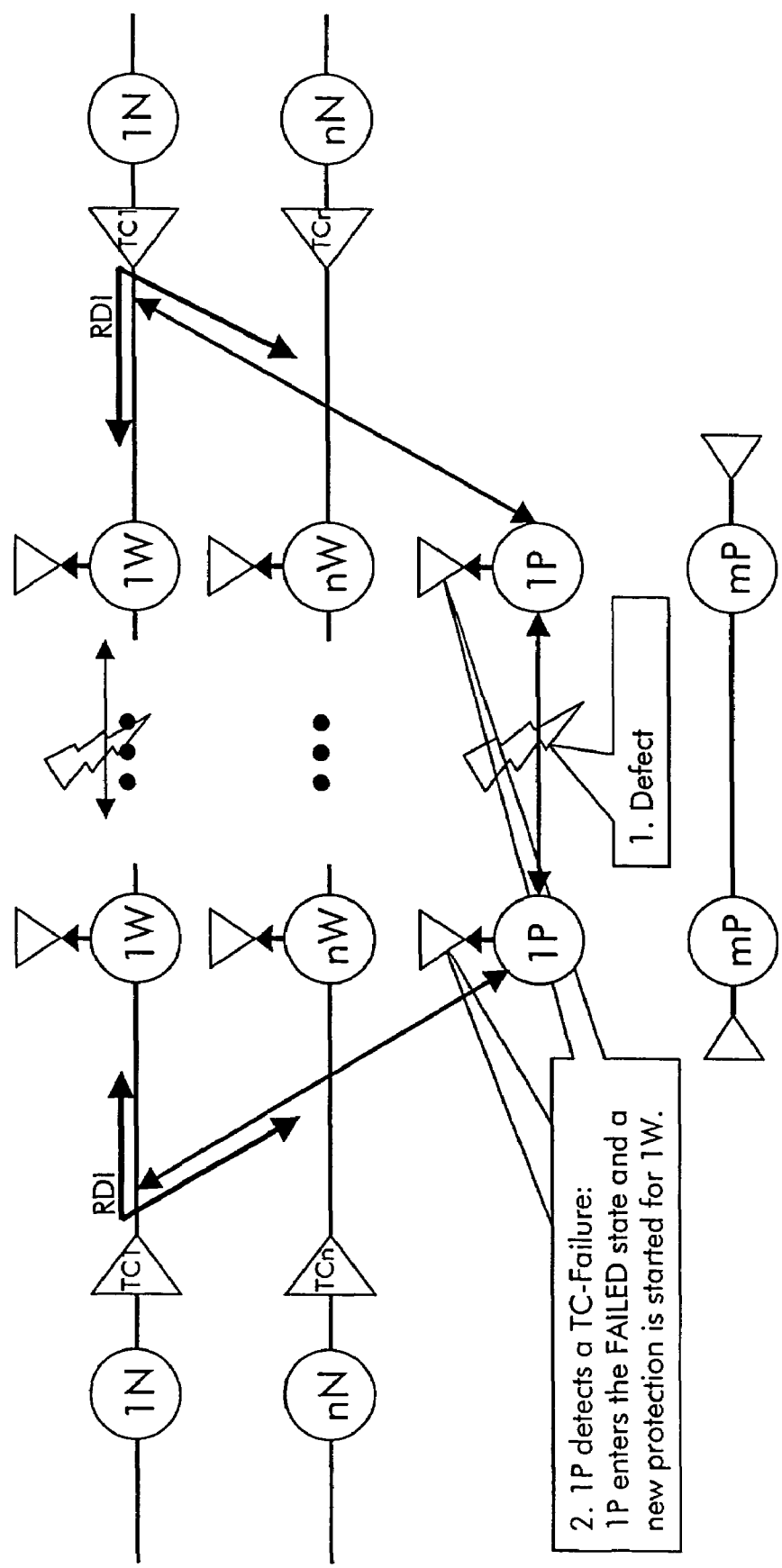

FIG. 11 shows the exceptional situation when a protection segment fails during protection, i.e., path 1N is bridged due to a failure on working path segment 1W to protection path segment 1P and 1P fails as well. In this event, both network elements NE1 and NE2 detect a tandem connection fault condition. The protection path segment 1P thus enters into FAILED state and a new protection is initiated for protected path segment 1W, excluding path segment 1P from the protection.

Figure 12:
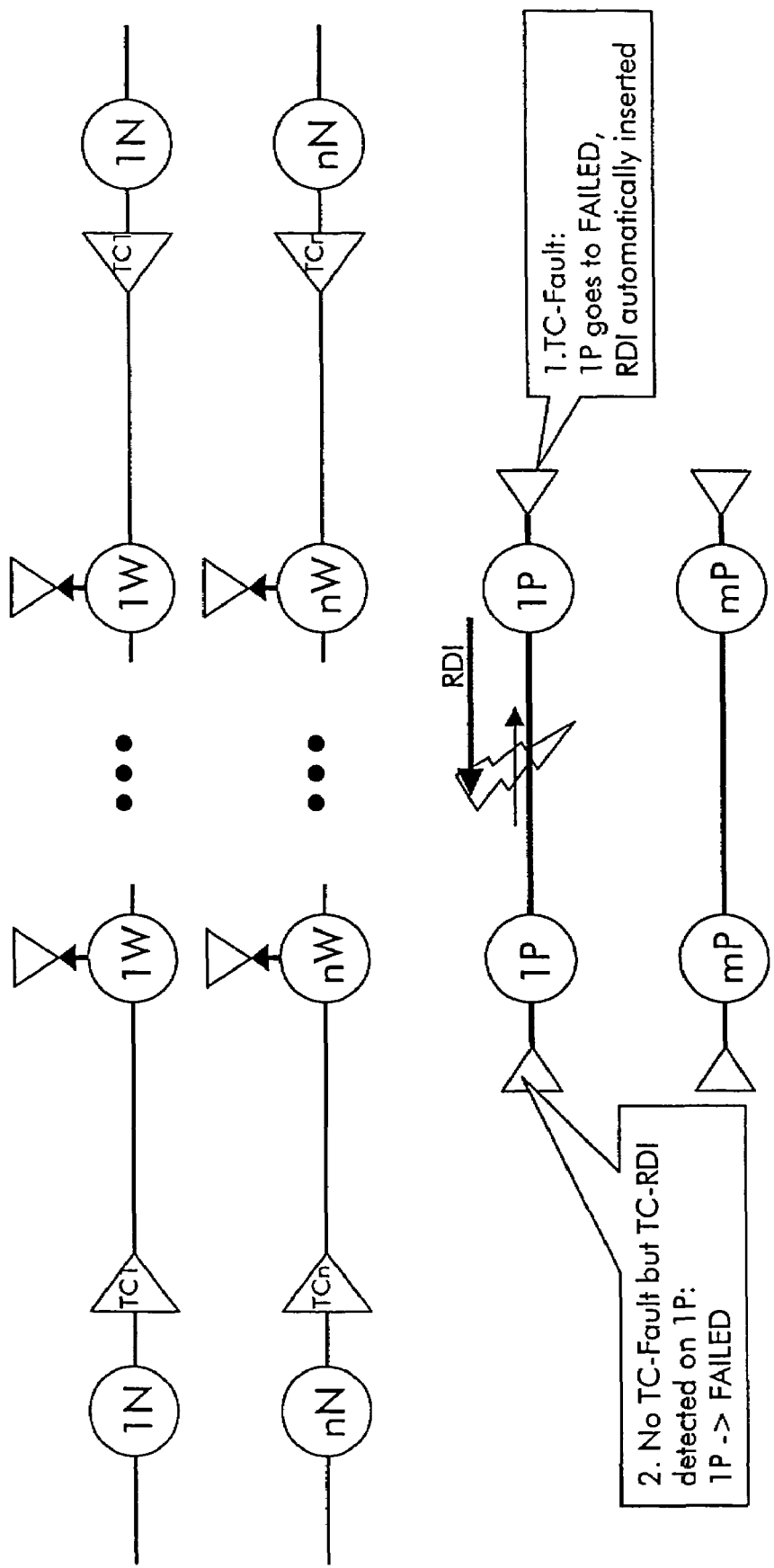

FIG. 12 shows the situation that the idle protection path segment 1P fails (unidirectional failure). At network element NE2 the monitoring function for a tandem connection created on the protection path segment 1P detects a TC fault condition. Path 1P goes thus in FAILED state and network element NE2 automatically inserts TC-RDI in reverse direction. Monitoring function in network element NE1 detects no fault condition but TC-RDI on path segment 1P and thus also goes in FAILED state for path segment 1P. 1P is thus excluded from the protection and will, as long as the failure persists, not be used in the case that one of the working paths segment fail.

Figure 13:
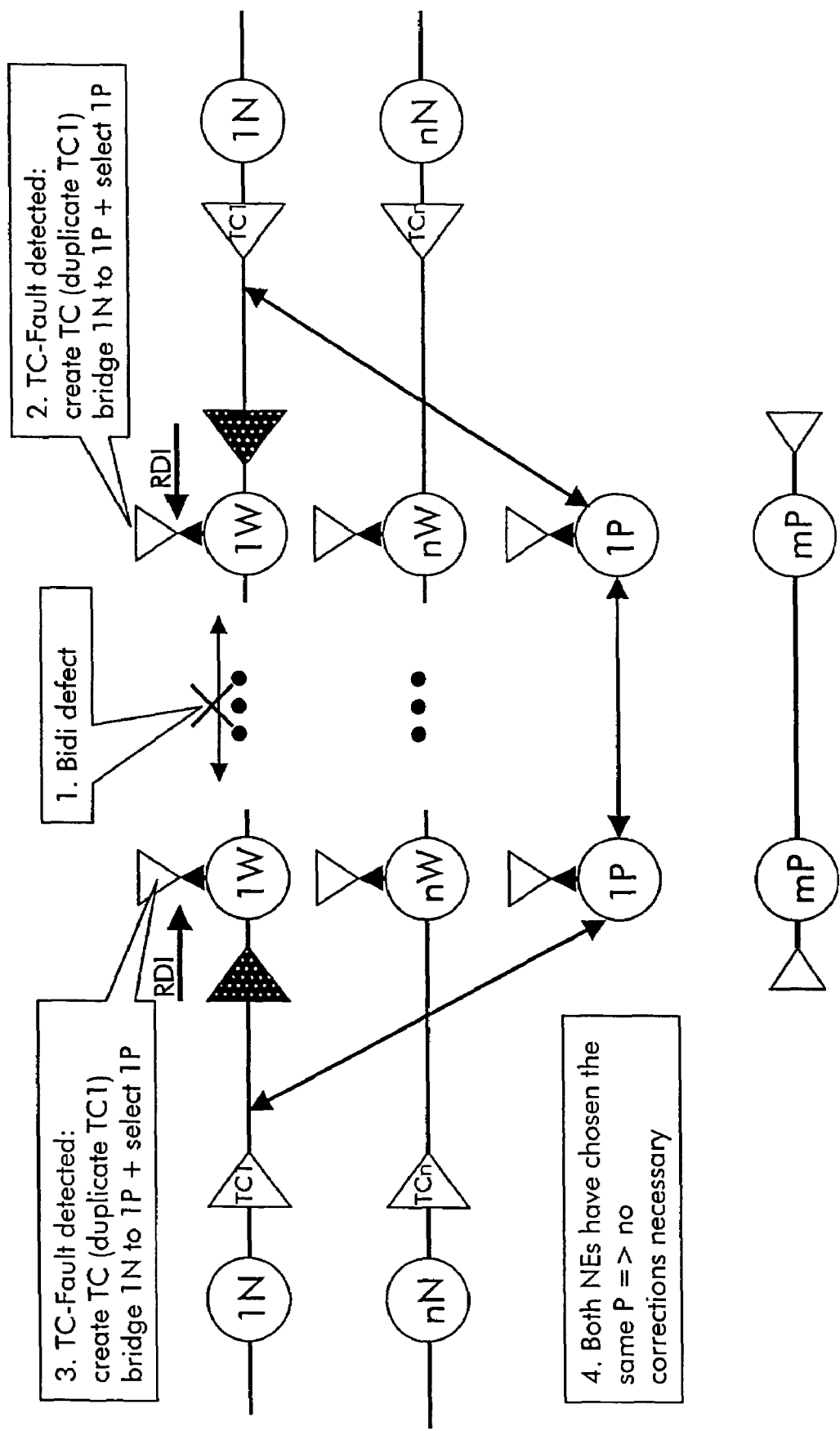
FIG. 13 shows a alternative solution to forced RDI insertion.

An alternative to forced RDI insertion as in the above embodiments is shown in FIG. 13. After occurrence of a bi-directional failure on path segment 1W (field 1), network element NE2 detects the TC fault condition. As a consequence action, NE2 creates a new tandem connection on failed path segment 1W by duplicating the existing tandem connection TC1 and bridges traffic from 1N to segment 1P and selects 1P to receive traffic for 1N (field 2). The duplicated TC1 will automatically insert RDI in reverse direction due to the occurrence of the failure. Network element NE1 therefore detects either a TC fault condition or the RDI inserted by duplicated TC1. As a consequence action, it also duplicates the tandem connection TC1, bridges 1N to 1P and selects 1P. If both network elements have selected the same protection path segment 1P, no corrective measures are necessary. Otherwise, a re-configuration of the protection switch by NE1 defined as slave would be initiated as explained above. The duplicated tandem connection TC1 on 1W serves to detect when the failure is removed in order to initiate return to normal operation.

This alternative makes use of the fact that according to conventional TC protocol, RDI is generated as long as a path segment on which the tandem connection is created fails. However, due to the protection switching, the overall path from 1N to 1N would be re-established over the protection path segment 1P and RDI on TC1 would thus automatically disappear. The alternative embodiment now shifts the duplicated TCM function TC1 from behind the switching matrix to in front of the switching matrix. This way, the failed path segment from 1W to 1W is exclusively monitored by the duplicated TC1 and RDI is sent on the duplicated TC1 as long as the failure persists. This allows to communicate the status of the failed working path segment from sink to source using TC-RDI without any modification to the existing TCM protocol, i.e., without introducing a forced RDI insertion function.

path of lower priority may be discarded to recover traffic of a failed protected path with higher priority. In a further improvement, idle protection paths may carry extra traffic.

One main reason to introduce m:n protection is the fast response time on failures. A preferable architecture would be to control the m:n protection switching in the central NE control instance, because inherently several I/O boards will be involved in an m:n configuration. However, large transmission network elements such as crossconnects may be composed of a number of I/O and matrix boards installed in several shelves, each having its own shelf controller that communicates with and is controlled by the central NE controller. In this case, data communication architecture between shelf controllers and central NE controller may not allow to perform the switching in the required response times of for example less than 300 ms.

There are several possible solutions to solve this problem. On the one hand, a real-time communication between the shelf controllers and a NE-central protection control unit can be implemented. On the other hand, a real-time data communication between the shelf controllers may be provided in order to synchronise protection switching between the shelf controllers. And further, protection switching may be implemented in the shelf controllers with the restriction that all working and protection paths of one m:n protection group must be routed to one shelf of the terminating NEs.

Although the invention has been explained for a segment of a path, it is clear, that the invention would be equally applicable to the protection of entire paths.

TABLE

| | \multicolumn{6}{c}{Event/State Check for a Protection Path} | | | | | |
|---|---|---|---|---|---|---|
| | FAILED | IDLE | PENDING | PROTECTING | WRS | WRB |
| W k | — | — | -> IDLE | -> WRS | — | — |
| W nok | — | ⇒PENDING | — | — | ⇒PENDING | ⇒PENDING |
| P nok | — | ⇒FAILED | ⇒FAILED 2) | ⇒FAILED 2) | ⇒FAILED | ⇒FAILED |
| P k | ⇒IDLE | — | — | — | — | — |
| W identified in P | — | — | ⇒PROTECTING | — | — | — |
| W not identified in P | — | — | — | ⇒PENDING | ⇒WRB | ⇒IDLE |
| W in P* identified, W already bridged to P | — | — | If NE is TRACKER ⇒IDLE 1) | — | — | — |
| WRS expired | — | — | — | — | ⇒WRB | — |
| WRB expired | — | — | — | — | — | ⇒IDLE |

1) bridge and selector adjusted to P*
2) new protection with another P initiated for W In a preferred improvement of the present invention, a network restoration is performed by the network management system in the case of a failure in order to establish a new path segment for the used protection path. The purpose is to restore the initial protection configuration (M:N) by providing a new working path from the available resources in the network. After the new path segment is re-established, reversion from protection may be initiated as explained above.

The network manager may consider path priorities and pre-emption for restoration, however, this does not necessarily mean that the NEs have to consider different priorities within the m:n paths during protection switching. Nonetheless, a further improvement of the present invention may consist in providing the ability to take into account different priorities of the protected paths for protection switching. For instance, an already established protection for a protected

What is claimed is:

1. A method for sub-network connection protection in a transmission network, said method comprising the steps of:
providing at least one protected path segment between a first network element and a second network element;
providing at least one protection path segment between said first and second network elements;
creating a tandem connection along said protected path segment between said first and second network elements;
detecting a failure on said protected path segment by means of a tandem connection monitoring function in the second network element; and
upon detection of the failure, inserting a tandem connection defect indication into a reverse traffic signal, bridging said reverse traffic signal to the protection path segment, and selecting said protection path segment to receive a traffic signal from the first network element, wherein said defect indication being transmitted on the protected path segment at least as long as the failure persists.

2. A method according to claim 1, further comprising the step of:
upon reception of said defect indication at the first network element, bridging said traffic signal to the protection path segment.

3. A method according to claim 1, further comprising the steps of:
detecting said failure by means of a tandem connection monitoring function in the first network element; and
upon detection of the failure; inserting a defect indication into said traffic signal, bridging said traffic signal to a protection path segment, and selecting said protection path segment to receive said reverse traffic signal from the protection path segment.

4. A method according to claim 1, wherein the insertion of said defect indication being effected by a forced insertion that persists even after traffic has been re-established over said protection path segment as long as the failure on the working path segment persists.

5. A method according to claim 1, wherein the insertion of said defect indication being effected by creating a duplicated tandem connection termination function in front of the switching point for the bridge, so that said duplicated tandem connection termination function serves for exclusively monitoring said failed protected path segment and automatically inserting a reverse defect indication as long as the failure persists.

6. A method according to claim 1, further comprising the steps of assigning an unique trail trace identifier to said tandem connection on said protected path segment and identifying a bridged traffic signal on a protection path segment by means of said trail trace identifier.

7. A method according to claim 1, further comprising the step of defining one of the tandem connection terminating network elements as slave network element and the other as master network element, said slave network element following the selection of a protection path segment of the master network element and using the same selected protection path segment in the case of a failure.

8. A method according to claim 1, further comprising the step of detecting when said failure is no longer present or when said defect indication is no longer received and initiating revert to normal operation.

9. A method according to claim 8, further comprising the steps of starting a first timer; after lapse of said first timer, reverting selection of said protection path segment and starting a second timer and after lapse of said second timer, removing said bridge to said protection path segment.

10. A method according to claim 1, further comprising the steps of:
communicating the occurrence of the failure to a network management system; and
by means of said network management system, providing a new working path segment between said first and second network elements.

11. A method according to claim 1, wherein said tandem connection defect indication is a tandem connection reverse defect indication or a tandem connection outgoing defect indication.

12. A method of protecting at least one protected path segment between a first network element and a second network element in a transmission network by means of at least one protection path segment, said method comprising the steps of:
detecting a failure on said protected path segment; and
bridging a traffic signal to be transmitted over said failed protected path segment to the protection path segment,
wherein said method characterized by the use of a tandem connection monitoring function to detect said failure and a tandem connection defect indication to communicate the occurrence of said failure from the second to the first network element and initiating said bridging step,
wherein said bridging step is performed by the first network element in accordance with the defect indication that is transmitted from the second network element to the first network element, and
wherein if said failure is cleared, a bridge from the protected path segment to the protection path segment provided by said bridging step is removed.

13. A network element for a transmission network, said network element and associated control means being adapted and programmed to
receive and transmit traffic signals on at least one protected path segment to a far end network element;
receive and transmit traffic signals on at least one protection path segment to the same far end network element;
create a tandem connection along said protected path segment;
detect a failure on said protected path segment by means of a tandem connection monitoring function; and
upon detection of the failure to insert a tandem connection defect indication into a reverse traffic signal, to bridge said reverse traffic signal to the protection path segment, and to select said protection path segment to receive a traffic signal from the first network element, said defect indication being transmitted on the protected path segment as long as the failure persists.

14. A network management system for a transmission network, said system being adapted and programmed to
provide at least one protected path segment between a first network element and a second network element that use a tandem connection monitoring function to detect a failure on said protected path;
provide at least one protection path segment between said first and second network elements; and
upon occurrence of the failure on said protected path detected and communicated by said second network element, provide said protection path as a new working path between said first and second network elements,
wherein said provision of the new working path is performed such that the first network element bridges a traffic signal to be transmitted over said failed protected path segment to the protection path segment in accordance with a defect indication transmitted from the second network element to the first network element, and
wherein if the failure is cleared, a bridge from the protected path segment to the protection path segment provided is removed.

15. A method according to claim 12, wherein the defect indication is transmitted in a reverse traffic signal over the protection path segment, and wherein said defect indication being transmitted on the protected path segment at least as long as the failure persists.

16. A network management system according to claim 14, wherein the defect indication is transmitted in a reverse traffic signal over the protection path segment, and wherein said defect indication being transmitted on the protected path segment at least as long as the failure persists.

* * * * *